(12) United States Patent
Cotts et al.

(10) Patent No.: US 6,620,895 B1
(45) Date of Patent: Sep. 16, 2003

(54) PROCESSING POLYETHYLENES

(75) Inventors: Patricia Metzger Cotts, Wilmington, DE (US); William Howard Tuminello, Newark, DE (US); Lin Wang, Hockessin, DE (US); Joel David Citron, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 43 days.

(21) Appl. No.: 09/675,028

(22) Filed: Sep. 28, 2000

Related U.S. Application Data (63) Continuation-in-part of application No. 09/408,250, filed on Sep. 22, 1999, now Pat. No. 6,297,338, which is a continuation-in-part of application No. 09/273,409, filed on Mar. 22, 1999, now Pat. No. 6,214,761.
(60) Provisional application No. 60/156,552, filed on Sep. 29, 1999.

(51) Int. Cl.[7] .............................................. C08F 210/16
(52) U.S. Cl. ........................ 526/113; 526/114; 526/115; 526/118; 526/119; 526/916; 264/454; 264/464; 264/564; 264/176.1; 264/459; 264/477
(58) Field of Search .................................. 264/454, 464, 264/564, 176.1, 459, 477; 526/113, 114, 115, 118, 119, 916

(56) References Cited

U.S. PATENT DOCUMENTS

| | | |
|---|---|---|
| 5,071,927 A | 12/1991 | Benham et al. |
| 5,137,994 A | 8/1992 | Goode et al. |
| 5,686,542 A | 11/1997 | Ostoja-Starzewski |
| 5,753,785 A | 5/1998 | Reddy et al. |
| 5,856,610 A | 1/1999 | Tamura et al. |
| 6,214,761 B1 * | 4/2001 | Bennett ..................... 502/117 |

FOREIGN PATENT DOCUMENTS

| | | |
|---|---|---|
| WO | WO 90/15085 | 12/1990 |
| WO | WO 96/23010 | 8/1996 |
| WO | WO 98/27124 | 6/1998 |
| WO | WO 99/50318 | 10/1999 |

OTHER PUBLICATIONS

Mecking, S., Reactor Belending with early/late transition metal catalyst combinations in ethylene polymerization, Macromolecular: Rapid Communications, Mar. 1999, p. 139–143, vol. 20, No. 3.

Birtovsek, et al., Novel olefin polymerization catalysts based on iron and cobalt, Chemical Communications, GB, Royal Society of Chemistry, 1998, p. 849–850, No. 7.

International Search Report for PCT/US00/26642 Sep. 28, 2000.

Denger, et al., *Simultaneous oligomerization and polymerization of ethylene*, Makromol. Chem., Rapid Commun., 1991, p. 697–701, vol. 12.

Benham, E. A. et al., *A Process for the Simultaneous Oligomerization and Copolymerization of Ethylene*, Polymer Engineering and Science, 1988, p. 1469–1472, vol. 28, No. 22.

* cited by examiner

Primary Examiner—David W. Wu
Assistant Examiner—R. Rabago (57) ABSTRACT

Polyethylenes made from ethylene and a series of α-olefins using a catalyst that copolymerizes ethylene and α-olefins usually have excellent melt processing characteristics, especially in uses where high zero shear viscosity and low high shear viscosity are desirable. These polyethylenes are preferably made by forming the α-olefins in situ from ethylene during the polymerization process. The polyethylenes are especially useful in blow molding, extrusion or extruded blown film processes.

22 Claims, 2 Drawing Sheets

Figure 1

PROCESSING POLYETHYLENES

This application claims priority under 35 U.S.C. 119 from U.S. Provisional application Ser. No. 60/156,552 files Sep. 29, 1999, which is a continuation in part of Ser. No. 09/408,250 filed Sep. 22, 1999 now U.S. Pat. No. 6,297,338, which is a continuation in part of Ser. No. 09/273,409 filed Mar. 22, 1999 now U.S. Pat. No. 6,214,761.

FIELD OF THE INVENTION

Polyethylenes made from ethylene and a series of α-olefins using a catalyst that copolymerizes ethylene and α-olefins usually have excellent melt processing characteristics, especially in uses where high zero shear viscosity and low high shear viscosity are desirable. These polyethylenes described herein are particularly suitable for blow molding, extrusion or making extruded blown film.

TECHNICAL BACKGROUND

Polyethylenes are important items of commerce, these being produced in larger volumes than any other polymer. Many different grades of this polymer type are produced, these differing grades varying in many properties, including cost. For an overview of polyethylenes, see B. Elvers, et al., Ed., *Ullmann's Encyclopedia of Industrial Chemistry*, 5$^{th}$ Ed., Vol. A21, VCH Verlagsgesellschaft, Weinheim, 1992, p. 488–518; and H. Mark et al., Ed., *Encyclopedia of Polymer Science and Engineering*, Vol. 6, John Wiley & Sons, New York, 1986, p. 383–489. Aside from cost the two major property areas of concern to most users (polymer processors) are final polymer physical properties (that is, does the polymer have physical properties suitable for the end use), and how difficult is it to form the polymer in the final article, often called processability. Oftentimes, the polymer user must compromise between better physical properties and better processability.

For example, the polyethylene with the highest tensile strength and highest use temperature (because of its relatively high melting point) is usually high density polyethylene (HDPE), which in its simplest form is the substantially linear polymer derived from ethylene. It is typically made by coordination polymerization of ethylene at moderate pressures (a few MPa) and temperatures (typically 50–150° C.). However its melt processability is relatively poor.

At the other end of the polyethylene scale is low density polyethylene (LDPE) which is made at very high pressures (a hundred or more MPa) and high temperatures (approximately 200° C.), necessitating the use of very expensive manufacturing plants and high operating costs to compress the ethylene for the polymerization. LDPE has relatively poor physical properties because it is highly branched, and these branches are believed to include both long chain branches (LCB, about 100 carbon atoms or more) and short chain branches (SCB, <<100 carbon atoms). However the presence of the branching, especially it is believed the LCBs, render LDPE what is generally considered to be the best processing type of polyethylene.

There have been many attempts to combine the best properties of HDPE and LDPE. One of these resulted in linear low density polyethylene (LLDPE), a copolymer of ethylene and a lower α-olefin, such as 1-butene, 1-hexene or 1-octene. Its processing is better than HDPE while not as good as LDPE, while its physical properties are better than LDPE but not as good as HDPE. Again a compromise (in a single polymer) is made between processability and physical properties.

For low cost, large volume polymers such as polyethylene, minimizing processing costs to form a shaped article is critical, since processing costs are a significant portion of the cost of the final shaped part. This means that processes with high throughput rates are particularly important, since they minimize cost. Among such processes are extrusion to produces so-called profile parts, blown film extrusion (in a sense a specialized form of extrusion), and blow molding which may be used to produce hollow parts such as bottles and other containers. The faster one can run these processes, the cheaper the produced parts will be. In the first part of melt forming in each of these processes, the polymer is extruded through a die under relatively high shear. The lower the viscosity of the polymer at high shear rate, the faster the polymer may be extruded at reasonable die pressures and without melt fracture. After exiting the die in each of these processes, and before the polymer solidifies, it is important that the polymer not deform (except when deformation is wanted, as when blowing the film, or blowing the hollow shape in blow molding) so as to hold the desired shape. For this part of the process one prefers to have a polymer with high melt viscosity at low shear. LDPE typically has just these properties, which is believed to be the reason it processes so well. Further it is believed in the art that these properties are the result of branching, especially LCB, in this polymer.

As mentioned above, LDPE is made in plants that are especially expensive to build and operate, and so LDPE tends to be more expensive than other grades of PE. A PE which could be made at lower pressures than LDPE is presently made, and which has the processability of LDPE, would therefore be advantageous. In addition if that polymer has better physical properties than LDPE, it would be even more advantageous.

U.S. Pat. No. 6,103,946 describes the oligomerization of ethylene with certain iron catalysts to form α-olefins. WO99/50318 (corresponding to U.S. patent application Ser. No. 09/273,409, filed Mar. 22, 1999, now U.S. Pat. No. 6,214,761) describes the manufacture of a branched polythylene by reaction of ethylene with a selected iron catalyst and a selected polymerization catalyst capable of copolymerizing ethylene and α-olefins. The above references are incorporated by reference herein for all purposes as if fully set forth.

Various reports of "simultaneous" oligomerization and polymerization of ethylene to form (in most cases) branched polyethylenes have appeared in the literature. See for instance WO90/15085, WO99/50318, U.S. Pat. No. 5,753,785, U.S. Pat. No. 5,856,610, U.S. Pat. No. 5,686,542, U.S. Pat. No. 5,137,994 and U.S. Pat. No. 5,071,927; C. Denger, et al, *Makromol. Chem. Rapid Commun.*, vol. 12, p. 697–701 (1991); and E. A. Benham, et al., *Polymer Engineering and Science*, vol. 28, p. 1469–1472 (1988).

None of the above references recognizes that any of the polymers made have exceptional rheological properties.

SUMMARY OF THE INVENTION

This invention concerns an improved process for blow molding, extrusion or making extruded blown film of a polyethylene, by forming a molten polyethylene into a useful shape using this process, wherein the improvement comprises, using as said polyethylene a polymer made by copolymerizing ethylene and a series of olefins of the formula $H_2C=CHR^{18}$, wherein $R^{18}$ is n-alkyl containing an even number of carbon atoms, and provided that:

said series of olefins contain at least four different olefins; and that in at least two different olefins of said series of olefins $R^{18}$ contains 10 or more carbon atoms.

This invention also concerns an improved process for blow molding, extrusion or making extruded blown film of a polyethylene, by forming a molten polyethylene into a useful shape using this process, wherein the improvement comprises, using as said polyethylene which has one or both of a structural index, $S_T$ (as defined herein), of about 1.4 or more, and a processability index, $P_R$ (as defined herein) of about 40 or more, provided that if $S_T$ is less than about 1.4, said polymer has fewer than 20 methyl branches per 1000 methylene groups.

Also disclosed herein is an improved process for blow molding, extrusion or making extruded blown film of a polyethylene, by forming a molten polyethylene into a useful shape using this process, wherein the improvement comprises, using as said polyethylene a polyethylene which has at least 2 branches each of ethyl and n-hexyl or longer and at least one n-butyl per 1000 methylene groups, and has fewer than 20 methyl branches per 1000 methylene groups, and obeys the equation $$[\eta]<0.0007 Mw^{0.66}$$

wherein $[\eta]$ is the intrinsic viscosity in 1,2,4-trichlorbenzene at 150° C. and Mw is the weight average molecular weight.

DETAILED DESCRIPTION OF THE PREFERRED EMBODIMENTS

Herein certain terms are used which are defined below.

By "hydrocarbyl" is meant a univalent radical containing only carbon and hydrogen. As examples of hydrocarbyls may be mentioned unsubstituted alkyls, cycloalkyls and aryls. If not otherwise stated, it is preferred that the hydrocarbyl groups herein contain 1 to 30 carbon atoms, and more preferably 1 to 20 carbon atoms.

By "substituted hydrocarbyl" herein is meant a hydrocarbyl group that contains one or more "inert functional groups" that are inert under the process conditions to which the compound containing these groups is subjected. The inert functional groups also do not substantially interfere with the oligomerization/polymerization process. For example, in cases in which the inert functional group may be near the complexed iron atom, such as $R^4$ or $R^5$ in formula (I) (shown below), or as a substituent on $R^4$, $R^5$, $R^6$ or $R^7$, the inert functional group should not coordinate to the iron atom more strongly than the three depicted N groups in (I) which are the desired coordinating groups—that is, the functional group should not displace one or more of the desired coordinating N groups. The hydrocarbyl may be completely substituted, as in trifluoromethyl. If not otherwise stated, it is preferred that substituted hydrocarbyl groups herein contain 1 to about 30 carbon atoms. Included in the meaning of "substituted" are heterocyclic rings.

Examples of inert functional groups include halo (fluoro, chloro, bromo and iodo), ester, keto (oxo), amino, imino, carboxyl, phosphite, phosphonite, phosphine, phosphinite, thioether, amide, nitrile, and ether. Preferred inert functional groups are halo, ester, amino, imino, carboxyl, phosphite, phosphonite, phosphine, phosphinite, thioether, and amide. With respect to catalysts based on ligands (I) and (II) described below, which inert functional groups are useful in which oligomerizations/polymerizations may in some cases be determined by reference to previously incorporated U.S. Pat. No. 6,103,946, as well as U.S. Pat. No. 5,955,555 and WO98/30612, which are also incorporated by reference herein for all purposes as if fully set forth.

By an oligomerization or polymerization "catalyst activator" is meant a compound that reacts with a transition metal compound to form an activated catalyst species. A preferred catalyst activator is an alkylaluminum compound, that is, a compound which has at least one alkyl group bound to an aluminum atom.

By "relatively noncoordinating" (or "weakly coordinating") anions are meant those anions as are generally referred to in the art in this manner, and the coordinating ability of such anions is known and has been discussed in the literature. See, for instance, W. Beck et al., *Chem. Rev.*, vol. 88, pp. 1405–1421 (1988), and S. H. Strauss, *Chem. Rev.*, vol. 93, pp. 927–942 (1993), both of which are hereby included by reference. Among such anions are those formed from aluminum compounds (such as those described in the immediately preceding paragraph) and $X^-$ (an anion as discussed in further detail below), including $(R^{29})_3AlX^-$, $(R^{29})_2AlClX^-$, $R^{29}AlCl_2X^-$, and $R^{29}AlOX^-$, wherein $R^{29}$ is alkyl. Other useful noncoordinating anions include BAF$^-$ {BAF=tetrakis[3,5-bis(trifluoromethyl)phenyl]borate}, SbF$_6^-$, PF$_6^-$, and BF$_4^-$, trifluoromethanesulfonate, p-toluenesulfonate, $(R_fSO_2)_2N^-$, and $(C_6F_6)_4B^-$.

By a "primary carbon group" herein is meant a group of the formula —CH$_2$- - -, wherein the free valence - - - is to any other atom, and the bond represented by the solid line is to a ring atom of an aryl or substituted aryl to which the primary carbon group is attached. Thus the free valence - - - may be bonded to a hydrogen atom, a halogen atom, a carbon atom, an oxygen atom, a sulfur atom, etc. In other words, the free valence - - - may be to hydrogen, hydrocarbyl, substituted hydrocarbyl or a functional group. Examples of primary carbon groups include —CH$_3$, —CH$_2$CH(CH$_3$)$_2$, —CH$_2$Cl, —CH$_2$C$_6$H$_5$, —OCH$_3$ and —CH$_2$OCH$_3$.

By a secondary carbon group is meant the group wherein the bond represented by the solid line is to a ring atom of an aryl or substituted aryl to which the secondary carbon group is attached, and both free bonds represented by the dashed lines are to an atom or atoms other than hydrogen. These atoms or groups may be the same or different. In other words the free valences represented by the dashed lines may be hydrocarbyl, substituted hydrocarbyl or inert functional groups. Examples of secondary carbon groups include —CH(CH$_3$)$_2$, —CHCl$_2$, —CH(C$_6$H$_5$)$_2$, cyclohexyl, —CH(CH$_3$)OCH$_3$, and —CH=CCH$_3$.

By a "tertiary carbon group" is meant a group of the formula wherein the bond represented by the solid line is to a ring atom of an aryl or substituted aryl to which the tertiary carbon group is attached, and the three free bonds represented by the dashed lines are to an atom or atoms other than hydrogen. In other words, the bonds represented by the dashed lines are to hydrocarbyl, substituted hydrocarbyl or inert functional groups. Examples of tetiary carbon groups include —C(CH$_3$)$_3$, —C(C$_6$H$_5$)$_3$, —CCl$_3$, —CF$_3$, —C(CH$_3$)$_2$OCH$_3$, —C≡CH, —C(CH$_3$)$_2$CH=CH$_2$, aryl and substituted aryl such as phenyl and 1-adamantyl.

By "aryl" is meant a monovalent aromatic group in which the free valence is to the carbon atom of an aromatic ring. An aryl may have one or more aromatic rings which may be fused, connected by single bonds or other groups.

By "substituted aryl" is meant a monovalent aromatic group substituted as set forth in the above definition of "substituted hydrocarbyl". Similar to an aryl, a substituted aryl may have one or more aromatic rings which may be fused, connected by single bonds or other groups; however, when the substituted aryl has a heteroaromatic ring, the free valence in the substituted aryl group can be to a heteroatom (such as nitrogen) of the heteroaromatic ring instead of a carbon.

The polyethylenes used herein are obtainable, and preferably obtained, by contacting ethylene with (a) an active oligomerization catalyst that oligomerizes ethylene to one or more α-olefins of the formula H$_2$C=CHR$^{18}$, wherein R$^{18}$ is an alkyl containing an even number of carbon atoms; and (b) a polymerization catalyst that is capable of copolymerizing ethylene and the α-olefins formed in the oligomerization. By "polyethylene" is meant a polymer in which at least 50 mole percent, preferably at least 70 mole percent, and more preferably at least 80 mole percent of the repeat units are derived from ethylene in the polymerization process. By a "homopolyethylene" herein is meant a polymer in which substantially all of the repeat units are derived from ethylene in the polymerization process. "Derived from ethylene" includes any comonomers generated in situ (either simultaneously with or in series with the actual polymerization) from ethylene such as, for example, those ethylene oligomers formed by the ethylene oligomerization catalyst. Homopolyethylenes are preferred herein.

The comonomer, whether formed in situ (preferred) or added separately to the polymerization, is a series of α-olefins of the formula H$_2$C=CHR$^{18}$, wherein R$^{18}$ is an alkyl containing an even number of carbon atoms. Other α-olefins, such as those in which R$^{18}$ contains an odd number of carbons may optionally be present. It is preferred that the series of α-olefins comprises individual α-olefins in which R$^{18}$ contains 2, 4, 6, 8, 10, 12, 14, 16 and optionally more carbon atoms. It is also preferred that the series of α-olefins comprises 5 mole percent or more, more preferably 10 mole percent or more, and especially preferably 15 mole percent or more, of α-olefins in which R$^{18}$ contains 10 or more carbon atoms, based on the total moles of α-olefins in the series. Preferably the oligomerization catalyst produces an α-olefin mixture that has an average degree of oligomerization (that is the average number of ethylene units per molecule) of 30 or less, more preferably 15 or less.

If the series of olefins is added to the polymerization (i.e., it is not a homopolyethylene) or the olefins are made first in series with the polymerization reaction and thus may be sampled, the olefin series being used may be analyzed, as by gas chromatography, to see if any of the above compositional limits on the olefin series are being met. If the olefin series is produced in situ simultaneously with the polymerization reaction, it may not be possible to obtain a representative sample of the olefin series. Generally the olefin series will be produced in situ by an ethylene oligomerization catalyst which forms the requisite olefins from ethylene, and is active in the absence of the first and second polymerization catalysts (see below). In this instance an oligomerization may be run in the absence of the polymerization catalyst(s) to produce only the series of olefins, under conditions which reasonably mimic the combined oligomerization/polymerization. The series of olefins thus obtained is then analyzed (as by gas chromatography) to determine if it meets appropriate limitations. Typical analyses of such series of olefins may be found in previously incorporated U.S. Pat. No. 6,103,946. It is assumed herein that the incorporation of α-olefins into a branched polyethylene is in proportion to the relative amounts in which they are present in the polymerization process. This may not be totally correct in the event, for example, that a volatile olefin such as 1-butene is partially "lost" to the polymerization reaction.

Oftentimes when such a series of olefins is made from ethylene a measure of the molecular weights of the olefins obtained is factor K from the Schulz-Flory theory (see for instance B. Elvers, et al., Ed. *Ullmann's Encyclopedia of Industrial Chemistry*, Vol. A13, VCH Verlagsgesellschaft mbH, Weinheim, 1989, p. 243–247 and 275–276. This is defined as:

$$K=n(C_{n+2} \text{ olefin})/n(C_n \text{ olefin})$$

wherein n(C$_n$ olefin) is the number of moles of olefin containing n carbon atoms, and n(C$_{n+2}$ olefin) is the number of moles of olefin containing n+2 carbon atoms, or in other words the next higher oligomer of C$_n$ olefin. From this can be determined the weight (mass) fractions of the various olefins in the resulting oligomeric reaction product mixture. The K factor is preferred to be in the range of about 0.55 to about 0.90, more preferably 0.65 to about 0.80. The K factor may also be varied by changing oligomerization conditions and/or the oligomerization catalyst, see for instance previously incorporated U.S. Pat. No. 6,103,946. By analyzing the branching pattern of the polymer produced one can roughly back calculate the K factor for the oligomerization to α-olefin, although there are possible errors (see below).

In one preferred embodiment, the polymer made is a homopolyethylene, and/or the series of olefins is prepared simultaneously with the polymerization reactions.

A preferred oligomerization catalyst for the preparation of the olefins is described in previously incorporated U.S. Pat. No. 6,103,946. More preferably, the oligomerization catalyst is an Fe complex (Fe[II] or Fe[III]) of a ligand of the general formula (I):

(I)

wherein:

$R^1$, $R^2$, $R^3$, $R^4$ and $R^5$ are each independently hydrogen, hydrocarbyl, substituted hydrocarbyl, or an inert functional group, provided that any two of $R^1$, $R^2$ and $R^3$ vicinal to one another, taken together may form a ring; and $R^6$ and $R^7$ are aryl or substituted aryl.

More preferably, the oligomerization catalyst is an Fe complex (Fe[II] or Fe[III]) of a ligand of the general formula (I), wherein:

$R^1$, $R^2$ and $R^3$ are each independently hydrogen, hydrocarbyl, substituted hydrocarbyl or an inert functional group, provided that any two of $R^1$, $R^2$ and $R^3$ vicinal to one another taken together may form a ring;

$R^4$ and $R^5$ are each independently hydrogen, hydrocarbyl, substituted hydrocarbyl or an inert functional group;

$R^6$ and $R^7$ are each independently an aryl or substituted aryl having a first ring atom bound to the imino nitrogen, provided that:

in $R^6$, a second ring atom adjacent to said first ring atom is bound to a halogen, a primary carbon group, a secondary carbon group or a tertiary carbon group; and further provided that in $R^6$, when said second ring atom is bound to a halogen or a primary carbon group, none, one or two of the other ring atoms in $R^6$ and $R^7$ adjacent to said first ring atom are bound to a halogen or a primary carbon group, with the remainder of the ring atoms adjacent to said first ring atom being bound to a hydrogen atom; or in $R^6$, when said second ring atom is bound to a secondary carbon group, none, one or two of the other ring atoms in $R^6$ and $R^7$ adjacent to said first ring atom are bound to a halogen, a primary carbon group or a secondary carbon group, with the remainder of the ring atoms adjacent to said first ring atom being bound to a hydrogen atom; or in $R^6$, when said second ring atom is bound to a tertiary carbon group, none or one of the other ring atoms in $R^6$ and $R^7$ adjacent to said first ring atom are bound to a tertiary carbon group, with the remainder of the ring atoms adjacent to said first ring atom being bound to a hydrogen atom.

By a "first ring atom in $R^6$ and $R^7$ bound to an imino nitrogen atom" is meant the ring atom in these groups bound to an imino nitrogen shown in (I), for example (III)

or (IV)

the atoms shown in the 1-position in the rings in (III) and (IV) are the first ring atoms bound to an imino carbon atom (other groups which may be substituted on the aryl groups are not shown). Ring atoms adjacent to the first ring atoms are shown, for example, in (V) and (VI), where the open valencies to these adjacent atoms are shown by dashed lines (the 2,6-positions in (V) and the 2,5-positions in (VI)).

(V)

or (VI)

Still more preferably, the oligomerization catalyst is an Fe complex (Fe[II] or Fe[III]) of a ligand of the general formula (II):

(II)

wherein:

each of $R^1$, $R^2$, $R^3$, $R^4$, $R^5$, $R^9$, $R^{10}$, $R^{11}$, $R^{14}$, $R^{15}$ and $R^{16}$ is independently selected from the group consisting of hydrogen, hydrocarbyl, substituted hydrocarbyl and an inert functional group; and $R^8$ is halogen, a primary carbon group, a secondary carbon group or a tertiary carbon group;

provided that:
  when $R^8$ is halogen or a primary carbon group none, one or two of $R^{12}$, $R^{13}$ and $R^{17}$ are independently a primary carbon group, an inert functional group or a trihalo tertiary carbon group, and the remainder of $R^{12}$, $R^{13}$ and $R^{17}$ are hydrogen;
  when $R^8$ is a secondary carbon group, none or one of $R^{12}$ $R^{13}$ and $R^{17}$ is a primary carbon group, a secondary carbon group, a trihalo tertiary carbon group or an inert functional group, and the remainder of $R^{12}$, $R^{13}$ and $R^{17}$ are hydrogen;
  when $R^8$ is a tertiary carbon group all of $R^{12}$, $R^{13}$ and $R^{17}$ are hydrogen;
  any two of $R^1$, $R^2$ and $R^3$ vicinal to one another, taken together may form a ring; and
  any two of $R^8$, $R^9$, $R^{10}$, $R^{11}$, $R^{12}$, $R^{13}$, $R^{14}$, $R^{15}$, $R^{16}$ and $R^{17}$ vicinal to one another, taken together may form a ring.

In one preferred embodiment of ligand (II), $R^4$ and $R^5$ are methyl or hydrogen; and/or $R^1$, $R^2$, and $R^3$ are all hydrogen; and/or $R^9$, $R^{10}$, $R^{11}$, $R^{14}$, $R^{15}$ and $R^{16}$ are all hydrogen; and/or $R^{17}$ is selected from the group consisting of methyl, ethyl, propyl, isopropyl, halo and trihalomethyl; and/or $R^{12}$ is selected from the group consisting of hydrogen, methyl, ethyl, propyl, isopropyl, halo and trihalomethyl. In certain more preferred embodiments, both $R^{12}$ and $R^{17}$ are methyl or ethyl. In all such cases, $R^8$ is halogen or a primary carbon group, and $R^{13}$ is hydrogen.

In specific preferred embodiments of ligand (II):
  $R^4$ and $R^5$ are methyl; $R^9$, $R^{10}$, $R^{11}$, $R^{13}$, $R^{14}$, $R^{15}$ and $R^{16}$ are all hydrogen; $R^{12}$ is hydrogen or methyl; $R^{17}$ is methyl; and $R^8$ is a primary carbon group; or
  $R^4$ and $R^5$ are methyl; $R^9$, $R^{10}$, $R^{11}$, $R^{13}$, $R^{14}$, $R^{15}$ and $R^{16}$ are all hydrogen; $R^{12}$ is hydrogen or ethyl; $R^{17}$ is ethyl; and $R^8$ is a primary carbon group; or
  $R^4$ and $R^5$ are methyl; $R^9$, $R^{10}$, $R^{11}$, $R^{13}$, $R^{14}$, $R^{15}$ and $R^{16}$ are all hydrogen; $R^{12}$ is hydrogen or isopropyl; $R^{17}$ is isopropyl; and $R^8$ is a primary carbon group; or
  $R^4$ and $R^5$ are methyl; $R^9$, $R^{10}$, $R^{11}$, $R^{13}$, $R^{14}$, $R^{15}$ and $R^{16}$ are all hydrogen; $R^{12}$ is hydrogen or n-propyl; $R^{17}$ is n-propyl; and $R^8$ is a primary carbon group; or
  $R^4$ and $R^5$ are methyl; $R^9$, $R^{10}$, $R^{11}$, $R^{13}$, $R^{14}$, $R^{15}$ and $R^{16}$ are all hydrogen; $R^{12}$ is hydrogen or chloro; $R^{17}$ is chloro; and $R^8$ is a primary carbon group; or
  $R^4$ and $R^5$ are methyl; $R^9$, $R^{10}$, $R^{11}$, $R^{13}$, $R^{14}$, $R^{15}$ and $R^{16}$ are all hydrogen; $R^{12}$ is hydrogen or trifluoromethyl; $R^{17}$ is trifluoromethyl; and $R^8$ is a primary carbon group.

In another preferred embodiment of ligand (II), $R^1$, $R^2$, $R^3$, $R^4$, $R^5$, $R^9$, $R^{10}$, $R^{11}$, $R^{14}$, $R^{15}$ and $R^{16}$ are as just defined, and if $R^8$ is a primary carbon group, $R^{12}$ and $R^{17}$ are hydrogen, and $R^{13}$ is a primary carbon group; or if $R^8$ is a secondary carbon group, $R^{12}$ and $R^{17}$ are hydrogen, and $R^{13}$ is a primary carbon group or a secondary carbon group.

Also preferred is when $R^8$ is a primary carbon group, preferably selected from methyl, ethyl, propyls and butyls.

There are many different ways of preparing active oligomerization catalysts from ligand (I) or its Fe complexes many of which are described in previously incorporated U.S. Pat. No. 6,103,964, as well as in WO99/50273 (equivalent to U.S. patent application Ser. No. 09/277910, filed Mar. 29, 1999 now U.S. Pat. No. 6,232,259) (also incorporated by reference herein for all purposes as if fully set forth), and those so described are applicable herein.

"Pure" Fe complexes may be exemplified by the formula (I)FeX$_n$, wherein each X is an anion, n is 1, 2 or 3 so that the total number of negative charges on the X groups is equal to the oxidation state of the Fe in the pure Fe complex. Preferably, each X is a monovalent anion, more preferably selected from the group consisting of a halide and a nitrile, and especially a halide such as chloride or bromide.

These pure Fe complexes may in and of themselves be active oligomerization catalysts, or they may be activated (or made more active) preferably by preparation in situ by contact with a catalyst activator in a variety of methods. Generally, it has been found that the most active catalysts are those that have been contacted with a catalyst activator.

In general, details for the preparation of oligomers (sometimes referred to as α-olefins) from ethylene using the oligomerization catalysts herein can be found in previously incorporated U.S. Pat. No. 6,013,964, as well as B. L. Small, et. al., *J. Am. Chem. Soc.*, vol. 120, p. 7143–7144 (1998) (also incorporated by reference herein).

Ethylene may be oligomerized by contacting a first compound W, which is a neutral Lewis acid capable of abstracting X$^-$ to form WX$^-$, with an iron halide complex of ligand (I) [or other X$^-$ complex of (I)], provided that the anion formed is a weakly coordinating anion; or a cationic Lewis or Bronsted acid whose counterion is a weakly coordinating anion.

In those instances in which the Fe complex of (I) does not contain an alkyl, hydride, or other group which may be displaced by ethylene already bonded to the metal (i.e., X is not alkyl or hydride), a neutral Lewis acid or a cationic Lewis or Bronsted acid may also alkylate or add a hydride to the metal, i.e., causes an alkyl group or hydride to become bonded to the metal atom, or a separate compound is added to add the alkyl or hydride group.

A preferred neutral Lewis acid, which can alkylate the metal, is a selected alkyl aluminum compound, such as $R^{20}_3Al$, $R^{20}_3AlCl$, $R^{20}AlCl_2$, and "$R^{20}AlO$" (alkylaluminoxanes), wherein $R^{20}$ is alkyl containing 1 to 25 carbon atoms, preferably 1 to 4 carbon atoms. Suitable alkyl aluminum compounds include methylaluminoxane (which is an oligomer with the general formula [MeAlO]$_n$), $(C_2H_5)_2AlCl$, $(C_2H_5)AlCl_2$ and $[(CH_3)_2CHCH_2]_3Al$. Metal hydrides such as NaBH$_4$ may be used to bond hydride groups to the metal M.

The polymerization catalyst for the copolymerization of the ethylene and the olefin series should preferably be a catalyst that can copolymerize ethylene and α-olefins so that the relative rate of copolymerization of these two types of monomers are similar. Such catalysts include Ziegler-Natta-type catalysts and metallocene catalysts. These types of catalysts are well known in the polyolefin field, see for instance *Angew. Chem., Int. Ed. Engl.*, vol. 34, p. 1143–1170 (1995), EP-A-0416815 and U.S. Pat. No. 5,198,401 for information about metallocene-type catalysts; and J. Boor Jr., *Ziegler-Natta Catalysts and Polymerizations*, Academic Press, New York, 1979 for information about Ziegler-Natta-type catalysts, all of which are hereby included by reference.

Many of the useful polymerization conditions for these types of catalysts and the oligomerizations catalysts coincide, so conditions for the polymerization are easily accessible. Oftentimes the "co-catalyst" or "activator" is needed for the copolymerization catalyst, much as W is sometimes needed for the oligomerization catalysts. In many instances the same compound, such as an alkylaluminum compound, may be used for these purposes for both types of catalysts.

Suitable catalysts for the copolymerization catalyst also include metallocene-type catalysts, as described in U.S. Pat. No. 5,324,800 and EP-A-0129368; particularly advantageous are bridged bis-indenyl metallocenes, for instance as described in U.S. Pat. No. 5,145,819 and EP-A-0485823. Another class of suitable catalysts comprises the well-known constrained geometry catalysts, as described in EP-A-0416815, EP-A-0420436, EP-A-0671404, EP-A-0643066 and WO91/04257. Also the class of transition metal complexes described in, for example, WO98/30609, U.S. Pat. No. 5,880,241, U.S. Pat. No. 6,060,569 and U.S. Pat. No. 5,714,556 can be used. Also useful are transition metal complexes of bis(carboximidamidatonates), as described in WO00/12568 (corresponding to U.S. patent application Ser. No. 08/383,900, filed Aug. 26, 1999 now U.S. Pat. No. 6,255,414). All of the aforementioned publications are incorporated by reference herein for all purposes as if fully set forth. Of the above, metallocene-type catalysts are preferred.

The catalysts herein may be "heterogenized" (to form a polymerization catalyst component, for instance) by coating or otherwise attaching them to solid supports, such as silica or alumina. Where an active catalyst species is formed by reaction with a compound such as an alkylaluminum compound, a support on which the alkylaluminum compound is first coated or otherwise attached is contacted with the transition metal compounds (or their precursors) to form a catalyst system in which the active polymerization catalysts are "attached" to the solid support. These supported catalysts may be used in polymerizations in organic liquids. They may also be used in so-called gas phase polymerizations in which the olefin(s) being polymerized are added to the polymerization as gases and no liquid supporting phase is present. The transition metal compounds may also be coated onto a support such as a polyolefin (polyethylene, polypropylene, etc.) support, optionally along with other needed catalyst components such as one or more alkylaluminum compounds.

The polymers produced herein will have branching patterns corresponding roughly to the distribution of olefins in the α-olefin series of the formula $H_2C=CHR^{18}$. However in branched polyethylenes in which $R^{18}$ contains more than 6–10 (depending on the $^{13}C$ NMR equipment used) carbon atoms one cannot directly tell the difference between those and longer branches, so there is no way known to the inventors to directly measure longer branches in the polymer formed. However preferred polymers have 1 or more, preferably 1 to 100, more preferably 1 to 30, of —$R^{18}$ branches per 1000 methylene atoms. The amount of these branches (as measured by total methyl groups) in the polymer preferably ranges from about 2 to about 200, especially preferably about 5 to about 175, more preferably about 10 to about 150, and especially preferably about 20 to about 150 branches per 1000 methylene groups in the polymer (for the method of measurement and calculation, see previously incorporated U.S. Pat. No. 5,880,241). Another preferable range for these branches is about 50 to about 200 methyl groups per 1000 methylene carbon atoms. It is also preferable (either alone or in combination with the other preferable features above) that in these branched polymers there is at least 2 branches each of ethyl and n-hexyl or longer and at least one n-butyl per 1000 methylene groups, more preferably at least 4 branches each of ethyl and n-hexyl or longer and at least 2 n-butyl branches per 1000 methylene groups, and especially preferably at least 10 branches each of ethyl and n-hexyl or longer and at least 5 n-butyl branches per 1000 methylene groups. It is also preferred that there are more ethyl branches than butyl branches in this homopolyethylene. In another preferred polymer (alone or in combination with any of the above preferred features) there are less than 20 methyl branches, more preferably less than 2 methyl branch, and especially preferably less than 2 methyl branches per 1000 methylene groups. All of the above branching levels measured by $^{13}C$ NMR are after correction for end groups.

Optionally present in the process may be one or more α-olefins containing an odd number of carbon atoms, thereby generating branching in the product polymer having one or more odd numbers of carbon atoms. With the exception of having odd branches, including methyl branches (from propylene, a preferred comonomer with an odd number of carbon atoms) the branching patterns of these polymers will be as described in the immediately preceding paragraph, and if propylene is not copolymerized, methyl branches will again not be present.

If one assumes that the rate of copolymerization of each of the α-olefins is proportional to its mole fraction in the α-olefin series, then the ratios of —$R^{18}$ branches in the resulting polymer will correspond to the molar ratio in the α-olefin series. However this may not be quite correct, especially for volatile olefins such as 1-butene and 1-hexene, some of which may be lost to the polymerization reaction by volatilization, depending on the particular equipment and process used for the polymerization.

As mentioned above in certain melt processing applications, such as blow molding, extrusion or making extruded blown film, it is advantageous to use a polymer that has relatively low high shear rate viscosity and/or (preferably and) relatively high low shear rate viscosity. Many of the polymers of the present invention have one or both such properties, and these are illustrated in the Examples. Blow molding (especially extrusion blow molding), extrusion and making extruded blown film are well known in the art, see for instance B. Elvers, et al., Ed., *Ullmann's Encyclopedia of Industrial Chemistry*, 5$^{th}$ Ed., Vol. A20, VCH Verlagsgesellschaft, Weinheim, 1992, p. 677–688; H. Mark et al., Ed., *Encyclopedia of Polymer Science and Engineering*, Vol. 2, John Wiley & Sons, New York, 1985, p. 447–478; ibid, Vol. 6, 1986, p. 571–645; and ibid, Vol. 7, 1987, p. 88–127, all of which are hereby included by reference.

Figure 1:
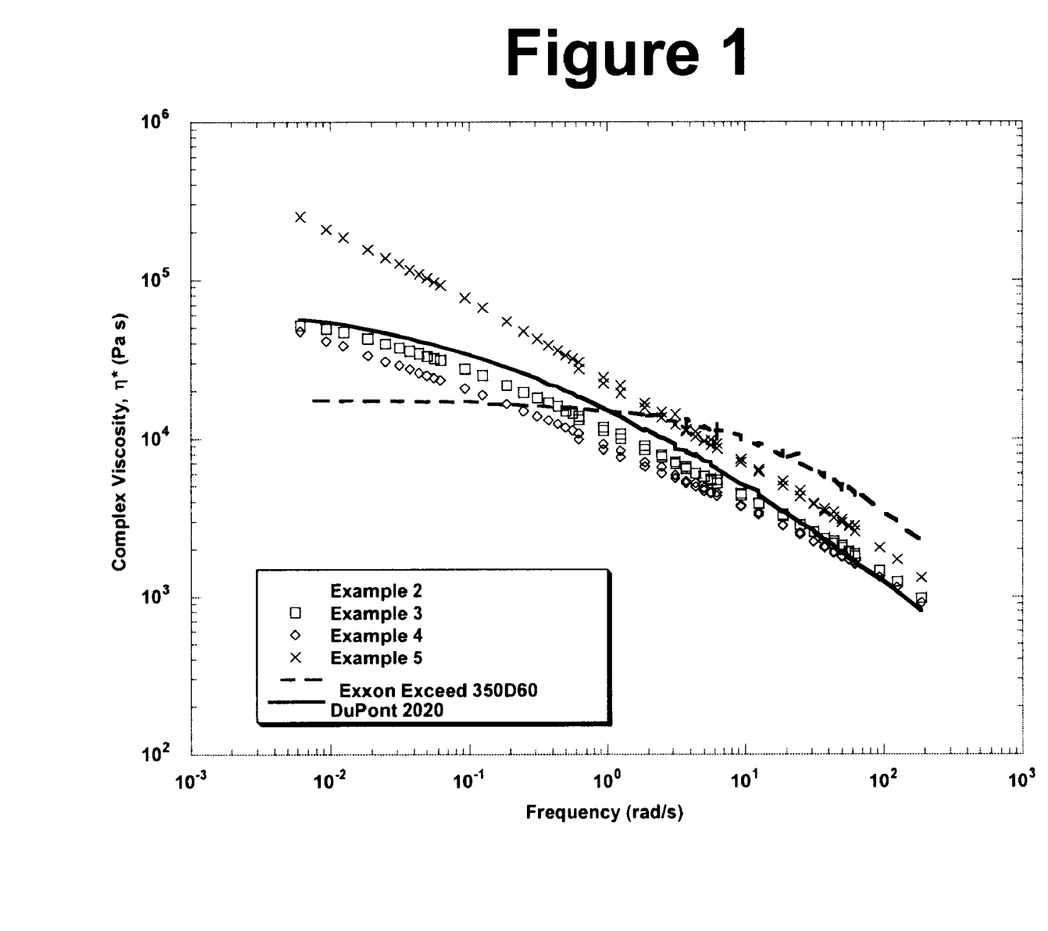
FIG. 1 shows the complex melt viscosity of polyethylenes, versus the operating frequency of the rheometer, as described in Example 6.

Some of the polymers produced by the polymerization herein have unusual rheological properties that make them suitable for the uses described herein. Using the data shown in FIG. 1, one can calculate certain indices which reflect the improved processing properties. One example is a structural index, $S_T$, which is defined as $$S_T = \eta_0/(8.33 \times 10^{-14})(M_w)^{3.4}$$

wherein $\eta_0$ is the zero shear viscosity at 140° C. and $M_w$ is the weight average molecular weight of the polymer. Materials that have a large proportion of carbon atoms in long chain branches as opposed to short chain branches will have a relatively high $S_T$. Preferably the polymer used herein have an $S_T$ of about 1.4 or more, more preferably about 2.0 or more. The $S_T$ of various polymers in the Examples is given in Table 2, at the end of Example 6.

Another index that may be used to measure the potential good processability of a polymer, based on its rheological properties, is $P_R$, the Processability Index. This is a shear thinning index, and is defined as $$P_R = (\eta^* \text{ at } 0.00628 \text{ rad/s})/(\eta^* \text{ at } 188 \text{ rad/s})$$

wherein $\eta^*$ is the viscosity at the indicated rate of the viscometer. This is similar to other ratios of vicosities at different shear levels, but covers a broader range of shears.

The higher the value of $P_R$ the greater the shear thinning of the polymer. It is preferred that $P_R$ of the polymers used herein be about 40 or more, more preferably about 50 or more, and especially preferably about 100 or more. Furthermore, any combination of $S_T$ and $P_R$ values mentioned herein are also preferred.

Figure 2:
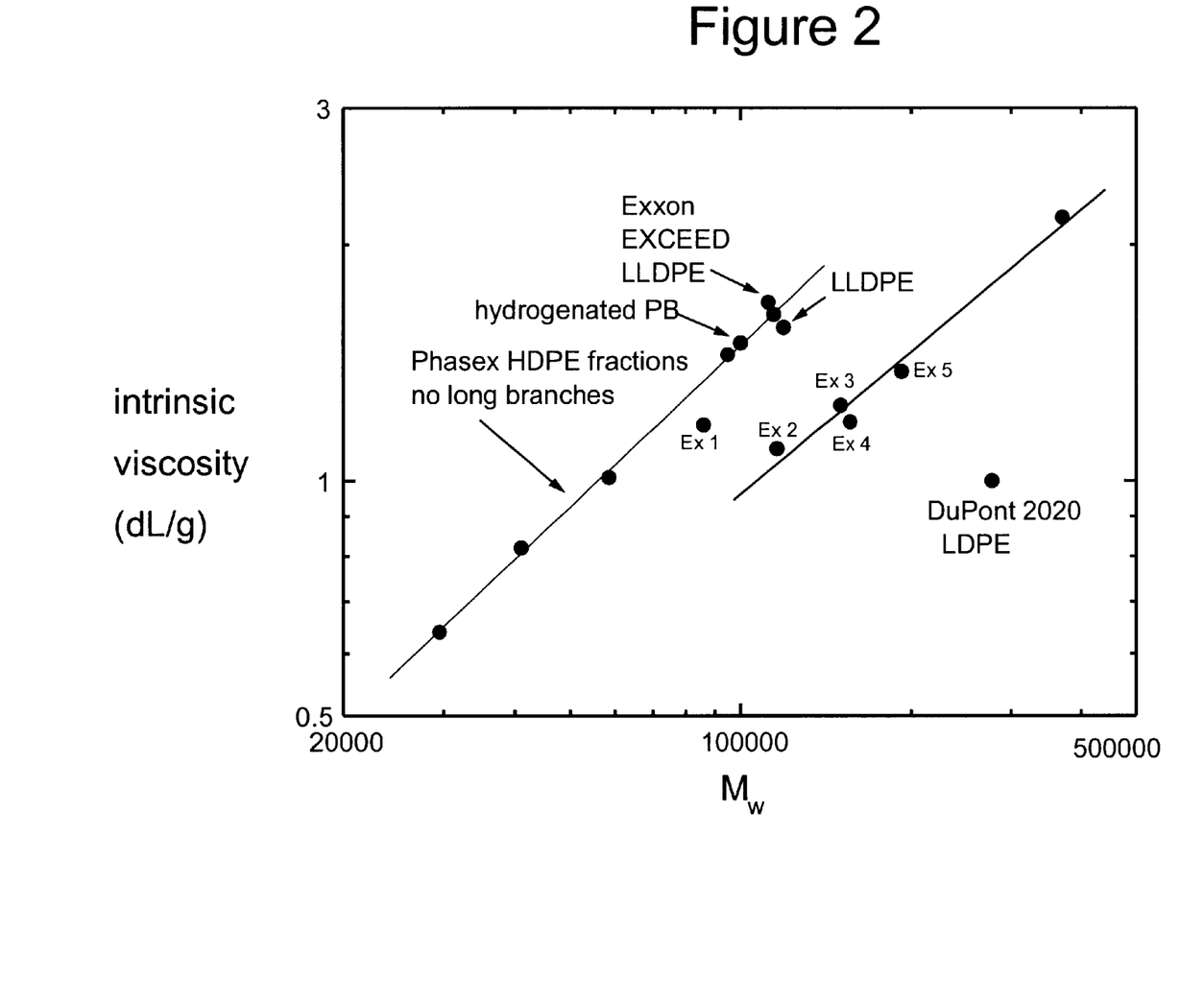
FIG. 2 shows the intrinsic viscosity, $[\eta]$, vs. the weight average molecular weight, Mw, for a series of polymers of this invention plus various other polymers, which are labeled.

Another way of finding polymers that may have good rheology (and possibly long chain branching) is the measuring the Mw versus the intrinsic viscosity. Polymers with good processing characteristics will have a lower intrinsic viscosity for a given Mw versus a (possibly more linear) worse processing polymer. FIG. 2 shows such relationships between various polyethylenes and other similar polymers, some of which are branched. It is clear that the polymers of this invention have lower intrinsic viscosities for their Mw's than similar "linear" polyethylenes. The line on the right is fitted to the present invention, while the line on the left is fitted to linear polyethylenes or polyethylenes with short chain branching only, such as typical LLDPEs such as Exxon's Exceed®. Indeed for the "better" polymers produced herein one could have the relationship $$[\eta]<0.0007Mw^{0.66}$$

and it is preferred that $$[\eta]<0.0007Mw^{0.63}$$

Of the two lines shown in FIG. 2, the left-hand line is of the equation

$$[\eta]=0.00054Mw^{0.69}$$

while the right hand line is of the equation $$[\eta]=0.00094Mw^{0.60}$$

For the purposes of these equations, Mw is determined by light scattering and intrinsic viscosity is determined in 1,2,4-trichlorobenzene at 150° C. (see below). The polymers of the present invention, especially when they have few methyl groups, and optionally one or more of the other branching patterns described above are thus novel.

In the Examples, all pressures are gauge pressures. The following transition metal compounds are used in catalyst systems. A is an ethylene oligomerization catalyst, while B is an ethylene and α-olefin copolymerization catalyst.

A is made by methods described in previously incorporated U.S. Pat. No. 6,103,964, while B may be made as described in Ewen, et al., *J. Am. Chem. Soc.*, vol. 110, p. 6255–6256 (1988).

In the Examples, the following abbreviations are used:
DSC—differential scanning calorimetry
GPC—gel permeation chromatography
MAO—methylaluminoxane
MAO-IP—an MAO with improved toluene solubility
MI—melt index
Mn—number average molecular weight
Mw—weight average molecular weight
PE—polyethylene
PD—Mw/Mn
RT—room temperature
TCE—tetrachloroethane The DSC was measured at a heating rate of 10° C./min, and the melting points were taken as the peak of the melting endotherm on the second heat. $^{13}$C NMR spectra were taken and interpreted generally as described in previously incorporated U.S. Pat. No. 5,880,241. A Varian Unity® 400 MHz or a Bruker 500 125 MHz spectrometer was used, using a 10 mm probe on typically 10–15 weight percent polymer solutions. The MI was taken according to ASTM method 1238, at a temperature of 190° C., using a 2.16 kg weight. Density by IR was determined by melt pressing films 0.2–0.3 mm (8–12 mils) in thickness at 180° C. and cooled at approximately 15° C./min. in the press. The IR spectrum of each film was obtained, and the peak absorbance of the known crystalline band at approx. 1894 cm$^{-1}$ was determined using a two-point baseline employing minima near 2100 and 1850 cm$^{-1}$. The ratio of this absorbance to film thickness (in mils), termed the infrared crystallinity number (IRCN), was related to density by a linear calibration. The method was calibrated by measuring the IRCN and gradient tube densities for melt pressed films of 24 commercial PE resins over a range of densities from 0.88 to 0.96. A linear fit to the data (adjusted r$^2$=0.993) gave the formula: density= 6.9707*IRCN+0.8643

EXAMPLE 1

A 600 mL Parr® reactor was cleaned, heated under vacuum and then allowed to cool under nitrogen. In a drybox, to a Hoke® cylinder was added 5 mL toluene and 4.2 mL MAO(13.5 wt % toluene solution). A (0.12 mg in 2 mL toluene) and B (3.5 mg) were mixed with 150 mL 2,2,4-trimethylpentane in a 300 mL RB flask. The flask was capped with a rubber septa. Both the Hoke® cylinder and the flask were brought out of the drybox. Under nitrogen protection, the catalyst solution was cannulated to the reactor. The reactor was pressured with nitrogen and then the nitrogen pressure was released. The reactor was then pressured with ethylene and the ethylene pressure was released. The reactor was heated to 65° C. and was pressurized with 965 kPa ethylene. The MAO solution was added from the Hoke® cylinder at slightly higher pressure. The ethylene pressure of the reactor was then adjusted to 1.31 MPa. The reaction mixture was allowed to stir for 25 min. The temperature of the reactor was controlled between 87 to 96° C. Heating source was removed. Ethylene was vented to about 210 kPa. The reactor was back filled with 1.38 MPa nitrogen and was vented to 210 kPa. This was done one more time. The reaction mixture was cooled to RT. The reaction mixture was then slowly poured into 400 mL methanol. After stirring at RT for 25 min, the polymer was filtered, blended to small pieces, washed with methanol six times and dried in vacuo. White polymer (24.0 g) was obtained. $^1$HNMR(TCE-d$_2$, 120° C.): 17Me/1000CH$_2$. GPC(PE standard, 135° C.): Mw=72,800; Mn=32,400; PD=2.2.

Based on DSC, the polymer had two melting points at 116° C. (14.8 J/g) and 103° C. (108.6 J/g). MI=0.40.

EXAMPLE 2

The supported catalyst was made by stirring a mixture of B (1.0 mg in 1 mL toluene), 54.6 mg 0.1 wt % A in biphenyl, 0.35 g silica supported MAO (18 wt % Al) and 15 mL toluene. After shaking for 30 min, the solid was filtered, washed with 3×5 mL toluene and dried in vacuo for 1 h. It was then stored in a freezer and was used the same day.

A 600 mL Parr® reactor was cleaned and was charged with 150 g of well baked NaCl. It was dried under full vacuum at 120° C. for 2 h. It was then charged with 690 kPa of nitrogen while it was still hot. A water bath was heated to 85° C. In a drybox, 0.66 mL 13.5 wt % MAO-IP toluene solution was mixed with 4 mL of toluene. It was transferred to a 5 mL gas tight syringe. This was brought out of the drybox and the solution was injected into the autoclave under positive nitrogen pressure. The mixture was stirred (600 RPM) at 690 kPa nitrogen for 20 min. Stirring was stopped. The reactor was then charged with 690 kPa of nitrogen. In a drybox, 110 mg of freshly made silica supported catalyst was mixed with 4.5 mL cyclohexane. This was transferred to a 5 mL gas tight syringe. It was brought out of the drybox. The mixture was then injected into the autoclave under positive nitrogen pressure. The mixture was then allowed to stir (600 RPM) at 690 kPa nitrogen for 15 min. Stirring was stopped. Nitrogen was released to 14 kPa. The autoclave was evacuated under full vacuum for 15 min, with stirring the last 5 min. It was recharged with 1.17 MPa nitrogen, then released to 14 kPa, and this was repeated. The mixture was allowed to stir at 500 RPM. Ethylene pressure (2.41 MPa) was applied. The reactor was placed in the 85° C. water bath. The mixture was allowed to stir at 90° C.–97° C. for 2 h. The RT mixture was mixed with 800 mL water. The polymer was filtered, washed with water and was blended into pieces with 400 mL water. It was then filtered, washed with 3× water. The polymer was blended a few more times, followed by water wash. It was then dried in vacuo. White polymer(26.6 g) was obtained. The small amount of leftover alpha-olefins were extracted using a Soxhlet extractor with hexanes. The polymer was then dried in vacuo overnight. Elemental analysis indicated that there was no salt (NaCl) left in the polymer. $^1$HNMR(TCE-$d_2$, 120° C.): 20Me/1000CH$_2$. GPC(PE standard, 135° C.): Mw=92,001; Mn=10,518; PD=8.8. The polymer had a melting point of 126° C. (74 J/g) based on DSC. MI=0.66. The density was 0.919 based on IR.

EXAMPLE 3

The supported catalyst was made by stirring a mixture of B (1.0 mg in 1 mL toluene), 109.2 mg 0.1 wt % A in biphenyl, 0.35 g silica supported MAO (18 wt % Al) and 15 mL toluene. After shaking for 30 min, the solid was filtered, washed with 3×5 mL toluene and dried in vacuo for 1 h. It was then stored in a freezer and was used the same day.

A 600 mL Parr® reactor was cleaned and was charged with 150 g of well baked NaCl. It was dried under full vacuum at 120° C. for 2 h. It was then charged with 690 kPa of nitrogen while it was still hot. A water bath was heated to 90° C.

In a drybox, 0.50 mL 13.5 wt % PMAO-IP toluene solution was mixed with 4 mL of toluene. It was transferred to a 5 mL gas tight syringe. This was brought out of the drybox and the solution was injected to the autoclave under positive nitrogen pressure. The mixture was stirred (600 RPM) at 690 kPa nitrogen for 20 min. Stirring was stopped. In a drybox, 150 mg of freshly made silica supported catalyst was mixed with 4.5 mL cyclohexane. This was transferred to a 5 mL gas tight syringe. It was brought out of the drybox. The mixture was then injected to the autoclave under positive nitrogen pressure. The mixture was then allowed to stir (600 RPM) at 690 kPa nitrogen for 15 min. Stirring was stopped. Nitrogen was released to 14 kPa. The autoclave was evacuated under full vacuum for 15 min, with stirring the last 5 min. It was recharged with 1.17 MPa nitrogen, then released to 14 kPa, and this was repeated. The mixture was allowed to stir at 500 RPM. Ethylene pressure (2.41 MPa) was applied. The reactor was placed in the 90° C. water bath. The mixture was allowed to stir at 92° C.–95° C. for 1 h, 56 min. Ethylene was then vented. The polymer/salt mixture was stirred with 600 mL water for 20 min. The polymer was filtered, washed with 3× water. The polymer was blended with 400 mL water, filtered, washed with 3× water, then stirred with 500 mL water for 1 h. This was repeated three times. An AgNO$_3$ test (for Cl) was negative at this point. The polymer was filtered, washed with water and then dried under full vacuum in a 90° C. oil bath overnight. White polymer (58.1 g) was obtained. The small amounts of leftover alpha-olefins were extracted using a Soxhlet extractor with hexanes. The polymer was then dried in vacuo overnight. Elemental analysis indicated that there was no salt (NaCl) left in the polymer. $^1$HNMR(TCE-$d_2$, 120° C.): 19Me/1000CH$_2$. GPC(PE standard, 135° C.): Mw=104,531; Mn=13,746; PD=7.6. The polymer had two melting points at 125° C. (85.8 J/g) and 101° C. (25 J/g) based on DSC. MI=0.96. The density was 0.912 based on IR.

EXAMPLE 4

The supported catalyst was made by stirring a mixture of B (1.0 mg in 1 mL toluene), 54.6 mg 0.1 wt % A in biphenyl, 0.35 g silica supported MAO (18 wt % Al) and 15 mL toluene. After shaking for 30 min, the solid was filtered, washed with 3×5 mL toluene and dried in vacuo for 1 h. It was then stored in a freezer and was used the same day.

A 600 mL Parr® reactor was cleaned and was charged with 150 g of well baked NaCl. It was dried under full vacuum at 120° C. for 2 h. It was then charged with 690 kPa of nitrogen while it was still hot. An oil bath was heated to 85° C. In a drybox, 0.66 mL 13.5 wt % MAO-IP in toluene solution was mixed with 4 mL of toluene. It was transferred to a 5 mL syringe. This was brought out of the drybox and the solution was injected into the autoclave under positive nitrogen pressure. The mixture was stirred (600 RPM) at 690 kPa nitrogen for 20 min. Stirring was stopped. In a drybox, 60 mg of freshly made silica supported catalyst was mixed with 4.5 mL cyclohexane. This was transferred to a 5 mL gas tight syringe. It was brought out of the drybox. The mixture was then injected into the autoclave under positive nitrogen pressure. The mixture was then allowed to stir (600 RPM) at 690 kPa nitrogen for 15 min. Stirring was stopped. Nitrogen was released to 14 kPa. The autoclave was evacuated under full vacuum for 15 minutes, with stirring the last 5 min. It was recharged with 1.17 MPa nitrogen, then released to 14 kPa, and this was repeated once. The mixture was allowed to stir at 500 RPM. Ethylene pressure (2.41 MPa) was applied. The reactor was placed in the 85° C. oil bath. The mixture was allowed to stir at 75° C.–85° C. for 1 h, then at 110° C.–115° C. for 2 hr. Ethylene was vented. The polymer/salt mixture was stirred with 600 mL water for 20 min. Polymer was filtered, and washed with 3× water. The polymer was blended with 400 mL water, filtered, washed with 3× water. The polymer was blended and washed again.

It was then dried in vacuo overnight. White polymer (22.7 g) was obtained. $^1$HNMR(TCE-d$_2$, 120° C.): 23Me/1000CH$_2$. GPC(PE standard, 135° C.): Mw=107,173; Mn=25,054; PD=4.3. The polymer had two melting points at 126° C. (32.9 J/g) and 114° C. (50.7 J/g) based on DSC. MI=2.0. The density was 0.919 based on IR.

EXAMPLE 5

The supported catalyst was made by stirring a mixture of B (0.25 mg in 1 mL toluene), 27.2 mg 0.1 wt % A in biphenyl, 0.35 g silica supported MAO (18 wt % Al) and 15 mL toluene. After shaking for 30 min, the solid was filtered, washed with 3×5 mL toluene and dried in vacuo for 1 h. It was then stored in a freezer and was used the same day.

A 600 mL Parr® reactor was cleaned and was charged with 150 g of well baked NaCl. It was dried under full vacuum at 120° C. for 2 h. It was then charged with 690 kPa of nitrogen while it was still hot. A water bath was heated to 85° C. In a drybox, 0.66 mL 13.5 wt % PMAO-IP in toluene solution was mixed with 4 mL of toluene. It was transferred to a 5 mL syringe. This was brought out of the drybox and the solution was injected to the autoclave under positive nitrogen pressure. The mixture was stirred (600 RPM) at 690 kPa nitrogen for 30 min. Stirring was stopped. In a drybox, 200 mg of freshly made silica supported catalyst was mixed with 4.5 mL cyclohexane. This was transferred to a 5 mL gas tight syringe. It was brought out of the drybox. The mixture was then injected to the autoclave under positive nitrogen pressure. The mixture was then allowed to stir (600 RPM) at 690 kPa nitrogen for 15 min. Stirring was stopped. Nitrogen was released to 14 kPa. The autoclave was evacuated under full vacuum for 15 min, with stirring the last 5 min. It was also recharged with 1.17 MPa nitrogen, then released to 14 kPa, and this was repeated once. The mixture was allowed to stir at 500 RPM. Ethylene pressure (2.41 kPa) was applied. The reactor was placed in the 85° C. water bath. The mixture was allowed to stir at 85° C.–93° C. for 2 h. Ethylene was then vented. The polymer/salt mixture was stirred with 600 mL water for 20 min. Polymer was filtered, washed with 3× water. The polymer was blended with 400 mL water, filtered, and washed with 3× water. The polymer was blended, filtered and washed again. It was then dried in vacuo overnight. White polymer (12.7 g) was obtained. $^1$HNMR (TCE-d$_2$, 120° C.): 25Me/1000CH$_2$. GPC(PE standard, 135° C.): Mw=116,721; Mn=43,094; PD=2.7. The polymer had two melting points at 122° C. (73.2 J/g) and 91° C. (73.1 J/g) based on DSC. MI=0.42. The density was 0.921 based on IR.

Using data from the GPC and $^{13}$C NMR analyses one can calculate a rough K factor for the oligomerization of the ethylene to α-olefin. Based on the Mn, the polymer should have 0.6 ends of chains for each 1000 CH$_2$ groups, so the actual level of Hex+ branches in this polymer, excluding ends of chains, is 12.6. Based on 4.4 butyl branches/1000 CH$_2$ groups and 11.5 Hex+ branches/1000 CH$_2$ groups, one can calculate that the K constant was about 0.64. As noted above this calculation is subject to several errors and should only be considered approximate.

Table 1 lists the branching distributions of the aboveprepared polymers, as determined by $^{13}$C NMR. No branches containing odd numbers of carbon atoms were detected. The branching levels for Hex+ include ends-of-chains.

TABLE 1

| Ex. No. | 1 | 2 | 3 | 4 | 5 |
|---|---|---|---|---|---|
| Et* | 6.5 | 5.4 | 6.6 | 4.6 | 4.9 |
| Bu** | 3.2 | 4.1 | 4.1 | 4.0 | 4.4 |
| Hex+*** | 6.5 | 9.2 | 9.7 | 9.6 | 13.2 |
| Hex+/Bu | 2.0 | 2.2 | 2.4 | 2.4 | 3.0 |
| Hex+/Et | 1.0 | 1.7 | 1.5 | 2.1 | 2.7 |

*, , *correspond to 1-butene, 1-hexene, 1-octene and longer olefins, respectively. No odd numbered branches were detected by $^{13}$CNMR

EXAMPLE 6

Rheological measurements were performed on some of the above polymers, as well as two comparative polymers. One of these was DuPont 2020 polyethylene, a low density polyethylene available from E. I. DuPont de Nemours & Co., Wilmington, Del. 19898 U.S.A. The other comparative polymer was a LLDPE, Exceed® 350D60 available from Exxon Chemical., Inc., Houston, Tex., U.S.A., reported to be a copolymer of ethylene and 1-hexene, and to have a density of 0.917 g/cm$^3$. This sample had an Mw of 112,000, as determined by light scattering.

A Bohlin CSM rheometer (Bohlin Instruments, Inc., Cranbury, N.J. 08512 U.S.A.) was used in the parallel plate mode with 25 mm diameter plates and 1 mm gap to make rheological measurements. Each molded sample was bathed in a nitrogen atmosphere and measurements were carried out at 140° C. after briefly heating to 190° C. to remove any traces of crystallinity. Measurements were made in the oscillatory mode between 0.001 and 30 Hz. The maximum stress applied was 2000 Pa and the collected data was always in the linear viscoelastic region. On the same sample, creep/recoil experiments at very low stress (10 Pa) were also performed immediately following the oscillatory flow. Measurements were made over 19 h to determine melt stability via viscosity and elasticity changes.

A special stabilizer package, sample loading and molding procedure were used. Ten ml of a stabilizer solution (0.2 g each of Irganox® 1010, Irganox® 1076 and Irgafos® 168 in 100 ml hexane) was squirted onto 1.2 g of pellets. Following air drying, the sample was placed overnight in a vacuum oven at 50° C. with nitrogen bleed. The polymer was then loaded into a cold vacuum mold. Vacuum was applied (pressure no greater than 1.3 kPa absolute) to the mold using a gasket to seal against air contamination. The evacuated mold was heated to 140° C., pressure applied followed by a quench cool to RT. Pressure was released at this point and the sample removed from the mold and placed immediately into the RT rheometer. The sample was then rapidly heated to 190° C. (this took about 5 min) then rapidly cooled (another 10 min) back to the measurement temperature prior to trimming, equilibration at the measurement temperature for about 15 min, and making measurements. The oscillatory flow experiments were performed first; they took about 1.5 h. These were followed immediately by the creep/recoil experiments which took about 16 additional h. Two identical creep/recoil experiments were done with 8 ks and 20,000 ks creep and recoil times, respectively. The entire rheometer was bathed in nitrogen and nitrogen was also applied to the rheometer air bearing. Our experience indicates that small amounts of air contamination with hydrocarbon polymers resulted in sample degradation. Two separate moldings and measurements were made per sample and the results shown are the averaged results shown in FIG. 1. Viscosities are calculated in the normal way as described, for example, in H. A. Barnes et al, *Rheology Series 3: An Introduction to Rheology*, Elsevier, Amsterdam (1989). FIG. 1 shows the complex melt viscosity of the polymers versus the operating frequency of the rheometer, which is a measure of shear rate. For these polymers, higher shear rates are equivalent to higher frequencies. Many of the polymers of the Examples above have viscosity profiles similar to the DuPont 2020 LDPE, an excellent processing polymer.

Some of these polymers were also analyzed by SEC (same as GPC) and MALS, multiangle light scattering, and at the same time viscometry, to obtain intrinsic viscosities, Mw, and radius of gyration. The weight averaged molecular weights (Mw) and intrinsic viscosities($[\eta]$) were determined using a Wyatt Technology (Sanata Barbara, Calif. 93117 U.S.A.) Dawn® DSP light scattering photometer and Viscotek (Houston, Tex., 77060 U.S.A.) 210R viscometer, respectively. Both of these were connected to a liquid chromatograph (Polymer Laboratories (Amherst, Mass. 01002, U.S.A.) PL210, also called SEC or GPC). Eluent from the SEC is directed to the light scattering instrument through a heated transfer line (also controlled at 150° C.) and then back into the PL210. The oven in the PL210 houses both the differential refractometer and the 210R viscometer as well as the SEC columns. The light scattering instrument employs an Ar ion laser at 488 nm. A single dn/dc of −0.100 (mL/g) (determined from many additional analyses) was used for all calculations. The actual concentration eluting from the column was determined from the calibrated differential refractometer using the dn/dc value of −0.100. In all cases, the integrated concentration was within 2–5% of the weighed mass of polymer injected. The solvent used was 1,2,4-trichlorobenzene; stabilized with 0.05% BHT. A temperature of 150° C. was used for dissolution of solutions and for analysis. Solutions were prepared in small (2 mL) vials at known concentrations of 0.1–0.15%, left in sealed vials in a heating block for 8–12 hours to dissolve, and then analyzed. Polymer solutions were not filtered prior to analysis. Injection volume was 200 microliters, resulting in the injection of 1–1.5 mg for each analysis. Results were obtained using software available from Wyatt Technology. The average intrinsic viscosity, $[\eta]$, reported in dL/g, was obtained by taking the ratio of the integrated viscometer peak and the integrated differential refractometer peak. Intrinsic viscosity results and Mw of various polymers are shown in Table 2.

The results of the Mw and intrinsic viscosity analyses are also plotted in FIG. 2, along with the results from other polyethylenes and hydrogenated poly(1,3-butadiene) (PB), a linear polymer which is the same (after hydrogenation) as polyethylene. It is clear that at a given Mw, many of the polymers used herein have a lower intrinsic viscosity at a given Mw than linear polyethylene or polyethylenes containing only short chain branching (LLDPE).

TABLE 2

| Polymer | $S_T$ | $P_R$ | Mw | $[\eta]$ |
|---|---|---|---|---|
| Example 1 | | | 86000 | 1.18 |
| Example 2 | ≧0.61 | 14.4 | 116000 | 1.10 |
| Example 3 | ≧1.8 | 52.6 | 150000 | 1.25 |
| Example 4 | ≧1.6 | 52.1 | 156000 | 1.19 |
| Example 5 | ≧3.8 | 190 | 193000 | 1.38 |
| Exxon Exceed ® 350D60 | 1.00 | 7.95 | 112000 | 1.69 |
| DuPont 2020 LDPE | 0.19 | 69.9 | 278000 | 1.00 |

What is claimed is:

1. A process for forming a molten polyethylene into a useful shape comprising blow molding, extruding or making extruded blown film of said polyethylene, characterized in that said polyethylene is a polymer made by copolymerizing ethylene and a series of olefins of the formula $H_2C{=}CHR^{18}$, wherein R is n-alkyl containing an even number of carbon atoms, and provided that:

said series of olefins contain at least four different olefins; and that in at least two different olefins of said series of olefins $R^{18}$ contains 10 or more carbon atoms.

2. The process as recited in claim 1, wherein said polyethylene is obtained by contacting ethylene with (a) an active oligomerization catalyst that oligomerizes ethylene to one or more α-olefins of the formula $H_2C{=}CHR^{18}$, wherein $R^{18}$ is an alkyl containing an even number of carbon atoms; and (b) a polymerization catalyst that is capable of copolymerizing ethylene and the α-olefins formed in the oligomerization.

3. The process as recited in claim 2, wherein said polyethylene is a homopolyethylene.

4. The process as recited in claim 1, wherein the K factor for said series of olefins is in the range of from about 0.55 to about 0.90.

5. The process as recited in claim 2, wherein said active oligomerization catalyst is an Fe complex of a ligand of the general formula (I):

wherein:
$R^1$, $R^2$, $R^3$, $R^4$ and $R^5$ are each independently hydrogen, hydrocarbyl, substituted hydrocarbyl, or an inert functional group, provided that any two of $R^1$, $R^2$ and $R^3$ vicinal to one another, taken together may form a ring; and $R^6$ and $R^7$ are aryl or substituted aryl.

6. The process as recited in claim 5, wherein:
$R^1$, $R^2$ and $R^3$ are each independently hydrogen, hydrocarbyl, substituted hydrocarbyl or an inert functional group, provided that any two of $R^1$, $R^2$ and $R^3$ vicinal to one another taken together may form a ring;

$R^4$ and $R^5$ are each independently hydrogen, hydrocarbyl, substituted hydrocarbyl or an inert functional group;

$R^6$ and $R^7$ are each independently an aryl or substituted aryl having a first ring atom bound to the imino nitrogen, provided that:

in $R^6$, a second ring atom adjacent to said first ring atom is bound to a halogen, a primary carbon group, a secondary carbon group or a tertiary carbon group; and further provided that in $R^6$, when said second ring atom is bound to a halogen or a primary carbon group, none, one or two of the other ring atoms in $R^6$ and $R^7$ adjacent to said first ring atom are bound to a halogen or a primary carbon group, with the remainder of the ring atoms adjacent to said first ring atom being bound to a hydrogen atom; or in $R^6$, when said second ring atom is bound to a secondary carbon group, none, one or two of the other ring atoms in $R^6$ and $R^7$ adjacent to said first ring atom are bound to a halogen, a primary carbon group or a secondary carbon group, with the remainder of the ring atoms adjacent to said first ring atom being bound to a hydrogen atom; or in $R^6$, when said second ring atom is bound to a tertiary carbon group, none or one of the other ring atoms in $R^6$ and $R^7$ adjacent to said first ring atom are bound to a tertiary carbon group, with the remainder of the ring atoms adjacent to said first ring atom being bound to a hydrogen atom.

7. The process as recited in claim 2, wherein said polymerization catalyst is a metallocene catalyst.

8. An improved process for blow molding, extrusion or making extruded blown film of a polyethylene, by forming a molten polyethylene into a useful shape using this process, wherein the improvement comprises, using as said polyethylene, one which has one or both of a structural index, $S_T$ (as defined herein), of about 1.4 or more, and a processability index, $P_R$ (as defined herein) of about 40 or more, provided that if $S_T$ is less than about 1.4, said polymer has fewer than 20 methyl branches per 1000 methylene groups.

9. The process as recited in claim 8, wherein $S_T$ is about 2.0 or more, and $P_R$ is about 50 or more.

10. The process as recited in claim 9, wherein $P_R$ is about 100 or more.

11. The process as recited in claim 8, wherein said polyethylene is obtained by contacting ethylene with (a) an active oligomerization catalyst that oligomerizes ethylene to one or more α-olefins of the formula $H_2C=CHR^{18}$, wherein $R^{18}$ is an alkyl containing an even number of carbon atoms; and (b) a polymerization catalyst that is capable of copolymerizing ethylene and the α-olefins formed in the oligomerization.

12. The process as recited in claim 11, wherein said polyethylene is a homopolyethylene.

13. The process as recited in claim 11, wherein said active oligomerization catalyst is an Fe complex of a ligand of the general formula (I):

(I)

wherein:
$R^1$, $R^2$, $R^3$, $R^4$ and $R^5$ are each independently hydrogen, hydrocarbyl, substituted hydrocarbyl, or an inert functional group, provided that any two of $R^1$, $R^2$ and $R^3$ vicinal to one another, taken together may form a ring; and $R^6$ and $R^7$ are aryl or substituted aryl.

14. The process as recited in claim 13, wherein:
$R^1$, $R^2$ and $R^3$ are each independently hydrogen, hydrocarbyl, substituted hydrocarbyl or an inert functional group, provided that any two of $R^1$, $R^2$ and $R^3$ vicinal to one another taken together may form a ring;
$R^4$ and $R^5$ are each independently hydrogen, hydrocarbyl, substituted hydrocarbyl or an inert functional group;

$R^6$ and $R^7$ are each independently an aryl or substituted aryl having a first ring atom bound to the imino nitrogen, provided that:

in $R^6$, a second ring atom adjacent to said first ring atom is bound to a halogen, a primary carbon group, a secondary carbon group or a tertiary carbon group; and further provided that in $R^6$, when said second ring atom is bound to a halogen or a primary carbon group, none, one or two of the other ring atoms in $R^6$ and $R^7$ adjacent to said first ring atom are bound to a halogen or a primary carbon group, with the remainder of the ring atoms adjacent to said first ring atom being bound to a hydrogen atom; or in $R^6$, when said second ring atom is bound to a secondary carbon group, none, one or two of the other ring atoms in $R^6$ and $R^7$ adjacent to said first ring atom are bound to a halogen, a primary carbon group or a secondary carbon group, with the remainder of the ring atoms adjacent to said first ring atom being bound to a hydrogen atom; or in $R^6$, when said second ring atom is bound to a tertiary carbon group, none or one of the other ring atoms in $R^6$ and $R^7$ adjacent to said first ring atom are bound to a tertiary carbon group, with the remainder of the ring atoms adjacent to said first ring atom being bound to a hydrogen atom.

15. The process as recited in claim 11, wherein said polymerization catalyst is a metallocene catalyst.

16. An improved process for blow molding, extrusion or making extruded blown film of a polyethylene, by forming a molten polyethylene into a useful shape using this process, wherein the improvement comprises, using as said polyethylene a polyethylene which has at least 2 branches each of ethyl and n-hexyl or longer and at least one n-butyl per 1000 methylene groups, and has fewer than 20 methyl branches per 1000 methylene groups, and obeys the equation $$[\eta]<0.0007Mw^{0.66}$$

wherein $[\eta]$ is the intrinsic viscosity of said polyethylene in 1,2,4-trichlorbenzene at 150° C. and Mw is the weight average molecular weight.

17. The process as recited in claim 16, wherein said polyethylene obeys the equation $$[\eta]<0.0007Mw^{0.63}.$$

18. The process as recited in claim 16, wherein said polyethylene is obtained by contacting ethylene with (a) an active oligomerization catalyst that oligomerizes ethylene to one or more α-olefins of the formula $H_2C=CHR^{18}$, wherein $R^{18}$ is an alkyl containing an even number of carbon atoms; and (b) a polymerization catalyst that is capable of copolymerizing ethylene and the α-olefins formed in the oligomerization.

19. The process as recited in claim 18, wherein said polyethylene is a homopolyethylene.

20. The process as recited in claim 18, wherein said active oligomerization catalyst is an Fe complex of a ligand of the general formula (I):

(I)

wherein:

$R^1$, $R^2$, $R^3$, $R^4$ and $R^5$ are each independently hydrogen, hydrocarbyl, substituted hydrocarbyl, or an inert functional group, provided that any two of $R^1$, $R^2$ and $R^3$ vicinal to one another, taken together may form a ring; and $R^6$ and $R^7$ are aryl or substituted aryl.

21. The process as recited in claim 20, wherein:

$R^1$, $R^2$ and $R^3$ are each independently hydrogen, hydrocarbyl, substituted hydrocarbyl or an inert functional group, provided that any two of $R^1$, $R^2$ and $R^3$ vicinal to one another taken together may form a ring;

$R^4$ and $R^5$ are each independently hydrogen, hydrocarbyl, substituted hydrocarbyl or an inert functional group;

$R^6$ and $R^7$ are each independently an aryl or substituted aryl having a first ring atom bound to the imino nitrogen, provided that:

in $R^6$, a second ring atom adjacent to said first ring atom is bound to a halogen, a primary carbon group, a secondary carbon group or a tertiary carbon group; and further provided that in $R^6$, when said second ring atom is bound to a halogen or a primary carbon group, none, one or two of the other ring atoms in $R^6$ and $R^7$ adjacent to said first ring atom are bound to a halogen or a primary carbon group, with the remainder of the ring atoms adjacent to said first ring atom being bound to a hydrogen atom; or in $R^6$, when said second ring atom is bound to a secondary carbon group, none, one or two of the other ring atoms in $R^6$ and $R^7$ adjacent to said first ring atom are bound to a halogen, a primary carbon group or a secondary carbon group, with the remainder of the ring atoms adjacent to said first ring atom being bound to a hydrogen atom; or in $R^6$, when said second ring atom is bound to a tertiary carbon group, none or one of the other ring atoms in $R^6$ and $R^7$ adjacent to said first ring atom are bound to a tertiary carbon group, with the remainder of the ring atoms adjacent to said first ring atom being bound to a hydrogen atom.

22. The process as recited in claim 18, wherein said polymerization catalyst is a metallocene catalyst.

* * * * *